US012640418B2

(12) United States Patent
Kim

(10) Patent No.: US 12,640,418 B2
(45) Date of Patent: May 26, 2026

(54) BATTERY CELL INCLUDING COOLING MEMBER

(71) Applicant: SK On Co., Ltd., Seoul (KR)

(72) Inventor: Min Seong Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 929 days.

(21) Appl. No.: 17/939,062

(22) Filed: Sep. 7, 2022

(65) Prior Publication Data

US 2023/0123317 A1 Apr. 20, 2023

(30) Foreign Application Priority Data

Oct. 18, 2021 (KR) ........................ 10-2021-0138424

(51) Int. Cl.
| | |
|---|---|
| *H01M 10/653* | (2014.01) |
| *H01M 10/613* | (2014.01) |
| *H01M 10/647* | (2014.01) |
| *H01M 10/6551* | (2014.01) |
| *H01M 50/105* | (2021.01) |
| *H01M 50/211* | (2021.01) |

(52) U.S. Cl.
CPC ....... *H01M 10/653* (2015.04); *H01M 10/613* (2015.04); *H01M 10/647* (2015.04); *H01M 10/6551* (2015.04); *H01M 50/105* (2021.01); *H01M 50/211* (2021.01)

(58) Field of Classification Search
CPC ............. H01M 10/653; H01M 10/613; H01M 10/647; H01M 10/6551; H01M 50/105; H01M 50/211
See application file for complete search history.

(56) References Cited

U.S. PATENT DOCUMENTS

| | | | |
|---|---|---|---|
| 2010/0132871 A1* | 6/2010 | Hattori ................... B32B 9/045 | |
| | | | 156/60 |
| 2014/0079913 A1 | 3/2014 | Nishiyama et al. | |
| 2018/0138472 A1* | 5/2018 | Choi ................... H01M 50/211 | |
| 2019/0237832 A1 | 8/2019 | Ju et al. | |
| 2020/0343575 A1 | 10/2020 | Kim et al. | |
| 2020/0343604 A1 | 10/2020 | Lee et al. | |

(Continued)

FOREIGN PATENT DOCUMENTS

| | | | | |
|---|---|---|---|---|
| EP | 0308216 A1 * | 3/1989 | ............... | C09J 7/38 |
| EP | 3285327 A1 | 2/2018 | | |
| EP | 3361554 A1 | 8/2018 | | |

(Continued)

OTHER PUBLICATIONS

EP 0308216 English Translation (Year: 1989).*
EP 3526282 English Translation (Year: 2019).*
WO 2017222853 English Translation (Year: 2017).*

*Primary Examiner* — Jimmy Vo

(74) *Attorney, Agent, or Firm* — The Webb Law Firm

(57) ABSTRACT

A battery cell includes an electrode assembly; a case including an accommodation portion in which the electrode assembly is accommodated, and a sealed portion formed along at least a portion of a circumference of the accommodation portion; and a cooling member interposed between the accommodation portion and the sealed portion to transfer heat of the accommodation portion to the sealed portion. The cooling member is formed of a material having thermal conductivity of 2W/mK or higher.

9 Claims, 8 Drawing Sheets

100

(56)　　　　　　References Cited

U.S. PATENT DOCUMENTS

2020/0388805　A1　　12/2020　Yoo et al.

FOREIGN PATENT DOCUMENTS

| KR | 1020170135473 | A | | 12/2017 | |
| KR | 1020180104772 | A | | 9/2018 | |
| KR | 20190004610 | A | * | 1/2019 | .......... H01M 50/186 |
| KR | 1020190004610 | A | | 1/2019 | |
| KR | 1020190032609 | A | | 3/2019 | |
| KR | 1020200030964 | A | | 3/2020 | |
| KR | 102184169 | B1 | | 11/2020 | |
| KR | 1020200125184 | A | | 11/2020 | |
| WO | WO-2017222853 | A1 | * | 12/2017 | ............. H10N 10/81 |

* cited by examiner

I-I'

BATTERY CELL INCLUDING COOLING MEMBER

CROSS-REFERENCE TO RELATED APPLICATION

This application claims priority to Korean Patent Application No. 10-2021-0138424 filed Oct. 18, 2021, the disclosure of which is hereby incorporated by reference in its entirety.

BACKGROUND OF THE INVENTION

1. Field of the Invention

The present disclosure relates to a battery cell and a battery module having the same.

2. Description of Related Art

Unlike primary batteries, secondary batteries may charge and discharge electricity, to be applied to devices within various fields such as digital cameras, mobile phones, notebook computers, and hybrid vehicles. Examples of secondary batteries include a nickel-cadmium battery, a nickel-metal hydride battery, a nickel-hydrogen battery, a lithium secondary battery, and the like.

Among such secondary batteries, many studies of lithium secondary batteries having high energy density and discharge voltage are in progress, and, recently, a lithium secondary battery is configured as a module by connecting a plurality of flexible pouch-type battery cells.

Meanwhile, when the battery module is used for a long time, heat may be generated by a battery, and in particular, a temperature therein may rise rapidly during charging, and such an increase in temperature of the battery may shorten a lifespan of the battery, may reduce efficiency of the battery, and may cause ignition or an explosion therein, in the worst case.

Accordingly, there may be a demand for a battery device capable of effectively dissipating heat generated by a battery cell.

SUMMARY OF THE INVENTION

An aspect of the present disclosure is to provide a battery cell capable of effectively dissipating heat generated by the battery cell, and a battery module having the battery cell.

According to an aspect of the present disclosure, a battery cell includes an electrode assembly; a case including an accommodation portion in which the electrode assembly is accommodated, and a sealed portion formed along at least a portion of a circumference of the accommodation portion; and a cooling member interposed between the accommodation portion and the sealed portion to transfer heat of the accommodation portion to the sealed portion, wherein the cooling member is formed of a material having thermal conductivity of 2 W/mK or higher.

In the present embodiment, the cooling member may include a core layer having a band shape; and an adhesive layer respectively stacked on both surfaces of the core layer.

In the present embodiment, the core layer may be formed of a material having thermal conductivity higher than thermal conductivity of the adhesive layer.

In the present embodiment, the core layer may be formed of any one of an acrylic resin, a urethane-based resin, a silicone-based resin, an epoxy-based resin, or an olefin-based resin.

In the present embodiment, the adhesive layer may be formed of any one of an acrylic adhesive, a silicone-based adhesive, or a rubber-based adhesive.

In the present embodiment, the core layer may be formed to be thicker than the adhesive layer.

In the present embodiment, a thickness of the cooling member may be 0.1 mm to 1 mm.

In the present embodiment, a thickness of the adhesive layer may be 0.01 mm to 0.2 mm.

In the present embodiment, the cooling member may include a heat transfer portion disposed between one surface of the sealed portion and the accommodation portion; and a heat dissipating portion disposed on the other surface of the sealed portion.

In the present embodiment, the heat transfer portion and the heat dissipation portion may be integrally formed to surround the sealed portion, and may be coupled to the sealed portion.

In the present embodiment, the cooling member may include a filler, wherein the filler may be formed of a material having thermal conductivity higher than the thermal conductivity of the core layer.

In addition, according to an aspect of the present disclosure, a battery module includes a battery cell including a case including an accommodation portion in which an electrode assembly is accommodated and a sealed portion formed along a circumference of the accommodation portion, and a cooling member formed of a material having thermal conductivity of 2 W/mK or higher and joining the accommodation portion and the sealed portion to each other; a module housing accommodating the battery cell therein; and a heat transfer member disposed between the module housing and the battery cell.

In the present embodiment, the cooling member may include a heat transfer portion disposed between the accommodation portion and the sealed portion; and a heat dissipating portion disposed between the sealed portion and the module housing.

BRIEF DESCRIPTION OF DRAWINGS

The above and other aspects, features, and advantages of the present disclosure will be more clearly understood from the following detailed description, taken in conjunction with the accompanying drawings, in which.

DESCRIPTION OF THE INVENTION

Figure 1:
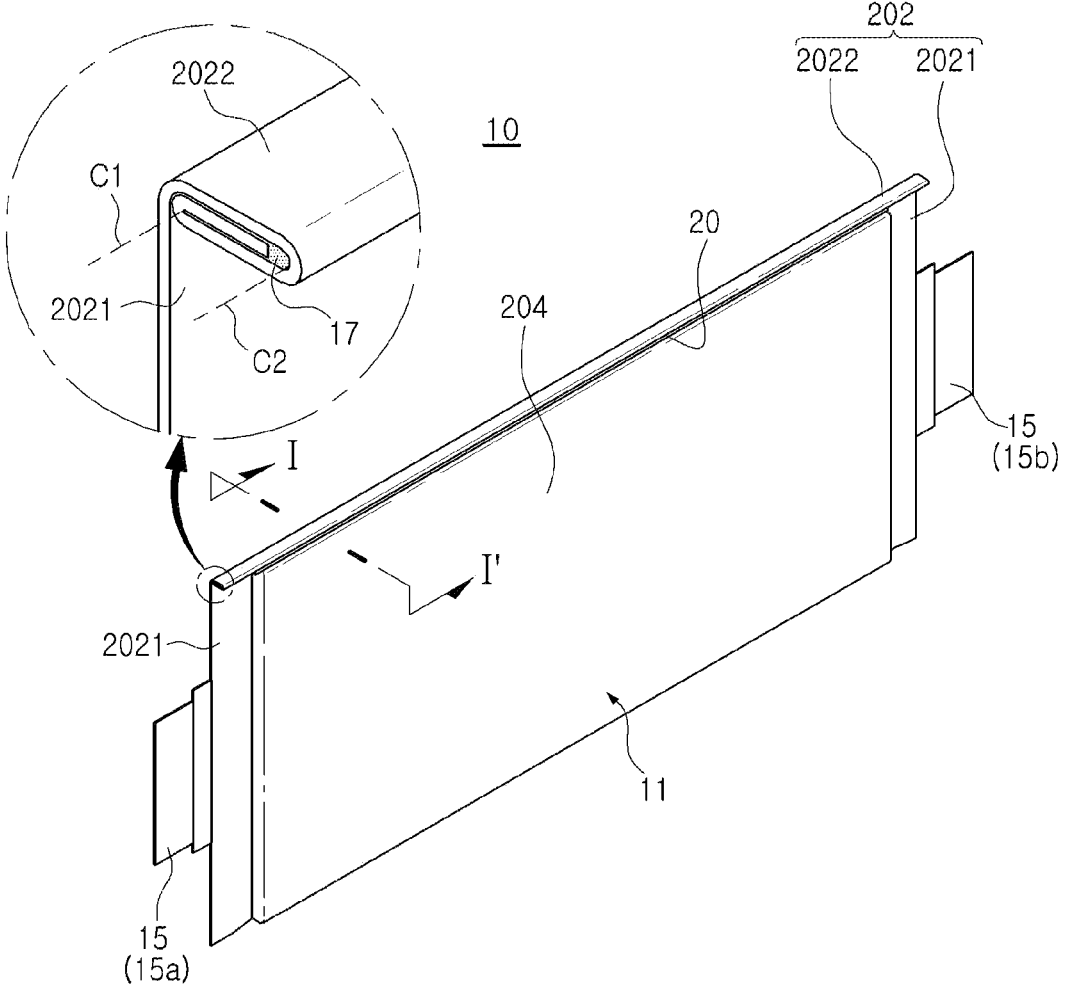
FIG. 1 is a perspective view of a battery cell according to an embodiment of the present disclosure.

Prior to the detailed description of the present disclosure, terms or words used in the specification and claims, described below, should not be construed as being limited to their ordinary or dictionary meanings, and the inventors should develop their own inventions in the best way. It should be interpreted as having a meaning and concept consistent with the technical idea of the present disclosure, based on the principle that it may be appropriately defined as a concept of a term for explanation. Therefore, it should be understood that since embodiments described in the specification and configurations illustrated in the drawings may be only the most preferred embodiments of the present disclosure, and do not represent all the technical ideas of the present disclosure, there may be various equivalents and variations to be replaced at the time of filing the present disclosure.

Hereinafter, preferred embodiments of the present disclosure will be described in detail with reference to the accompanying drawings. In this case, it should be noted that the same components in the accompanying drawings may be denoted by the same reference numerals as much as possible. In addition, detailed descriptions of well-known functions and configurations that may obscure the gist of the present disclosure will be omitted. For the same reason, some components may be exaggerated, omitted, or schematically illustrated in the accompanying drawings, and a size of each of the components does not fully reflect an actual size thereof.

Figure 2:
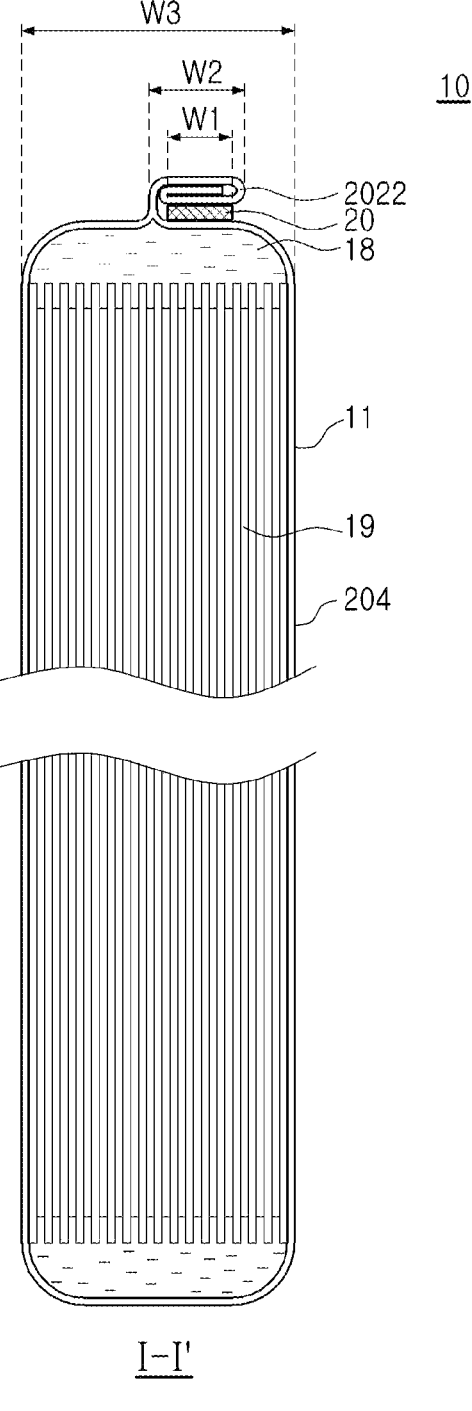
FIG. 2 is a cross-sectional view of FIG. 1, taken along line
Figure 3A:
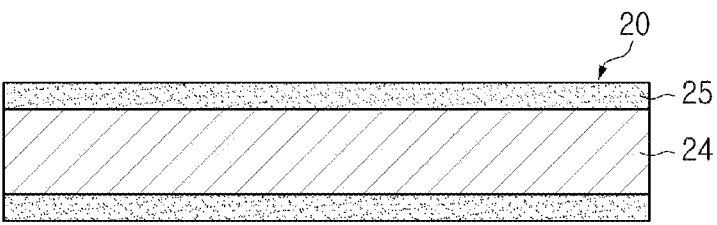
FIGS. 3A and 3B are enlarged views of the cooling member illustrated in FIG. 2.
Figure 3B:
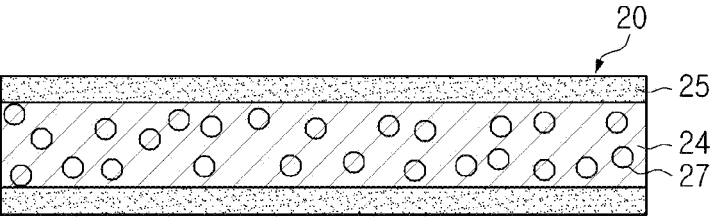

FIG. 1 is a perspective view of a battery cell according to an embodiment of the present disclosure, FIG. 2 is a cross-sectional view of FIG. 1, taken along line I-I', and FIGS. 3A and 3B are enlarged views of the cooling member illustrated in FIG. 2.

Referring to FIGS. 1 to 3B, a battery cell 10 according to the present embodiment may include an electrode assembly 19, a case 11 accommodating the electrode assembly 19, and a cooling member 20.

A battery cell 10 according to the present embodiment may be a rechargeable secondary battery, and may include a lithium ion (Li-ion) battery or a nickel metal hydride (Ni— MH) battery. The nickel metal hydride battery may be a secondary battery using nickel for a positive electrode, a hydrogen storage alloy for a negative electrode, and an aqueous alkali solution as an electrolyte. The nickel metal hydride battery may have relatively large capacity per unit volume, and may thus be used as an energy source for electric vehicles (EVs), hybrid vehicles (HEVs), or the like, and used in various fields such as energy storage or the like.

The case 11 may form an exterior of the battery cell 10, and may protect elements accommodated therein from an external environment. A pouch-type exterior material in which a surface of a metal thin film is insulated may be used as the case 11. The metal thin film may be formed of aluminum, and the insulation may include applying modified polypropylene, which is a polymer resin, for example, cast polypropylene (CPP) to form a sealing layer, and forming a resin material such as nylon or polyethylene terephthalate (PET) on an outer side surface thereof.

In the present embodiment, the case 11 may be prepared by forming a single sheet of exterior material. Therefore, after forming at least one accommodation space in the exterior material, the case 11 may be completed by folding the exterior material to form the accommodation space as one space.

An accommodation space in which the electrode assembly 19 is accommodated may be provided in the case 11. In addition, an electrode lead 15 may protrude from the case 11.

The electrode assembly 19, together with an electrolyte, may be accommodated in the accommodation space of the case 11.

The case 11 may be completed by folding the exterior material, joining adjacent edge portions, and then sealing the accommodation space. A thermal fusion method may be used as a method of joining the edge portions, but the present disclosure is not limited thereto. Hereinafter, a portion in which the electrode assembly 19 and the electrolyte are accommodated may be referred to as an accommodation portion 204, and an edge portion to which the exterior material is joined may be referred to as a sealed portion 202.

The sealed portion 202 may be prepared to form a flange extending from the accommodation portion 204 externally, and thus the sealed portion 202 may be disposed along an outer edge of the accommodation portion 204.

In the present embodiment, the sealed portion 202 may be divided into a first sealed portion 2021 in which the electrode lead 15 is disposed, and a second sealed portion 2022 in which the electrode lead 15 is not disposed.

In the present embodiment, after forming a single sheet of the exterior material, the exterior material may be folded to form the case 11. Therefore, there may be no need to form the sealed portion 202 on a surface (a lower surface in FIG. 2) on which the exterior material are folded. Therefore, in the present embodiment, the sealed portion 202 may be formed on the outer edge of the accommodation portion 204, may be provided only on three of four surfaces forming the accommodation portion 204 in the thickness direction, and no sealed portion may be formed on one remaining surface (the lower surface in FIG. 2).

In addition, in a battery cell 10 of the present embodiment, the sealed portion 202 may be configured in a folded form at least once, to increase junction reliability of the sealed portion 202, and minimize an area of the sealed portion 202.

More specifically, in the sealed portion 202 of the present embodiment, the second sealed portion 2022 on which the electrode lead 15 is not disposed may be fixed after being folded twice.

For example, the second sealed portion 2022 may be folded by 180 degrees along a first bending line C1 and a second bending line C2, illustrated in FIG. 1, and may be then closely fixed to the accommodation portion 204.

In this case, an adhesive member 17 may be filled in the second sealed portion 2022, and thus the second sealed portion 2022 may be maintained to have a folded shape by the adhesive member 17. The adhesive member 17 may be formed of an adhesive having a high thermal conductivity. For example, the adhesive member 17 may be formed of epoxy or silicone, but the present disclosure is not limited thereto.

In the present embodiment, the electrode lead 15 may include a positive electrode lead 15a and a negative electrode lead 15b. The positive electrode lead 15a and the negative electrode lead 15b may be respectively connected to the electrode assembly 19, and may be formed of a plate-shaped metal. For example, the positive electrode lead 15a may be formed of an aluminum (Al) material, and the negative electrode lead 15b may be formed of a copper (Cu) material. However, the present disclosure is not limited thereto.

In the present embodiment, the positive electrode lead 15a and the negative electrode lead 15b may be arranged to face each other in opposite directions. However, a configuration of the present disclosure is not limited thereto, and various modifications may be performed as needed, such as arranging the positive electrode lead 15a and the negative electrode lead 15b to face in the same direction.

The cooling member 20 may be disposed between the second sealed portion 2022 and the accommodation portion 204, and one surface of the cooling member 20 may be joined to the second sealed portion 2022 and the other surface of the cooling member 20 may be joined to the accommodation portion 204. Therefore, the second sealed portion 2022 may be attached to the accommodation portion 204 by the cooling member 20.

Referring to FIG. 3A, in the present embodiment, a band-shaped member such as a film or tape may be used as the cooling member 20, and the cooling member 20 may include a core layer 24, and an adhesive layer 25 respectively stacked on both surfaces of the core layer 24.

The core layer 24 may be formed of a material having a high thermal conductivity, and may transfer heat generated in the accommodation portion 204 of the battery cell 10 to the second sealed portion 2022.

To effectively transfer the heat, in the present embodiment, the cooling member 20 may have thermal conductivity of 2 W/mK or higher. In addition, the thermal conductivity of the cooling member 20 may be adjusted by a material constituting the core layer 24.

Therefore, the core layer 24 may include any one of an acrylic resin, a urethane-based resin, or a silicone-based resin, having a high thermal conductivity. In addition to the above, an epoxy-based resin, or an olefin-based resin may be also used as the core layer 24.

In addition, as illustrated in FIG. 3B, when it is difficult to ensure a desired thermal conductivity with only the resin component, the cooling member 20 may include a filler 27. For example, a member having an excellent thermal conductivity may be included in the core layer 24 in an appropriate ratio. In this case, the filler 27 may be formed of a material having thermal conductivity higher than thermal conductivity of the core layer 24.

In the present embodiment, as the filler 27, a ceramic filler 27 may be used in consideration of insulating properties. For example, a ceramic particle formed of a material such as $Al_2O_3$, AlN, BN, SiN, SiC, or the like may be used as the filler 27 of the present embodiment. In addition, when the insulating properties of the cooling member 20 are secured, a carbon filler 27 such as graphite or the like may be also used. An amount of the filler 27 may be selected within a range in which thermal conductivity, insulating properties, or the like of the core layer 24 is secured.

In addition, the core layer 24 may also provide a function of suppressing excessive elongation of the cooling member 20 in a process of attaching the cooling member 20 to the sealed portion 202. To this end, the core layer 24 may be formed of a material having an elongation, lower than an elongation of the adhesive layer 25, not to easily stretch.

The adhesive layer 25 may be stacked on both surfaces of the core layer 24 to be joined to the second sealed portion 2022 and the accommodation portion 204, respectively.

Any one of an acrylic adhesive, a silicone-based adhesive, or a rubber-based adhesive may be used as the adhesive layer 25, but the present disclosure is not limited thereto. In addition, the adhesive layer 25 may be formed of a moisture curable resin, a heat curable resin, a UV curable resin, or a room temperature curable resin. However, the present disclosure is not limited thereto.

When the adhesive layer 25 is excessively thin, it may be difficult to secure stickiness, and when the adhesive layer 25 is excessively thick, thermal conductivity of the cooling member 20 may be reduced. Therefore, in the present embodiment, the adhesive layer 25 may be formed in a range of 0.01 mm to 0.2 mm in consideration of stickiness and thermal conductivity.

When the cooling member 20 is excessively thin, there may be a high possibility that the cooling member 20 will be damaged in a handling process or in an attachment process of the cooling member 20. Therefore, for efficiency of a manufacturing process, the cooling member 20 of the present embodiment may be formed to have a thickness of 0.1 mm or more.

In addition, when the cooling member 20 is excessively thick, an interval between the sealed portion 202 and the accommodation portion 204 may increase to increase a size of the battery cell, and thus efficiency for thermal conductivity may decrease. In consideration of the above, the cooling member 20 may be formed to have a thickness of 1 mm or less. Therefore, the thickness of the cooling member 20 according to the present embodiment may be formed in a range of 0.1 mm to 1 mm.

As illustrated in FIG. 2, in the present embodiment, a width W1 of the cooling member 20 may be formed to be narrower than a width W2 of the second sealed portion 2022 facing the accommodation portion 204. In addition, the width W2 of the second sealed portion 2022 may be formed to be narrower than a width W3 of one surface of the accommodation portion 204 (a thickness of the accommodation portion) facing the second sealed portion 2022. Therefore, the second sealed portion 2022 may be entirely disposed within a thickness range of the accommodation portion 204. In addition, the one surface of the cooling member 20 may be entirely joined to the second sealed portion 2022, and the other surface of the cooling member 20 may be entirely joined to the accommodation portion 204.

In the battery cell 10 of the present embodiment configured as described above, the sealed portion 202 may be in close contact with and may be fixedly joined to the accommodation portion 204 by the cooling member 20. Therefore, an energy density of the battery cell 10 may be maximized.

In addition, since the cooling member 20 has thermal conductivity of 2 W/mK or higher, heat generated in the accommodation portion 204 may be rapidly transferred to the sealed portion 202 through the cooling member 20. Therefore, a high heat dissipation effect may be provided.

Next, a battery module according to an embodiment of the present disclosure will be described.

Figure 4:
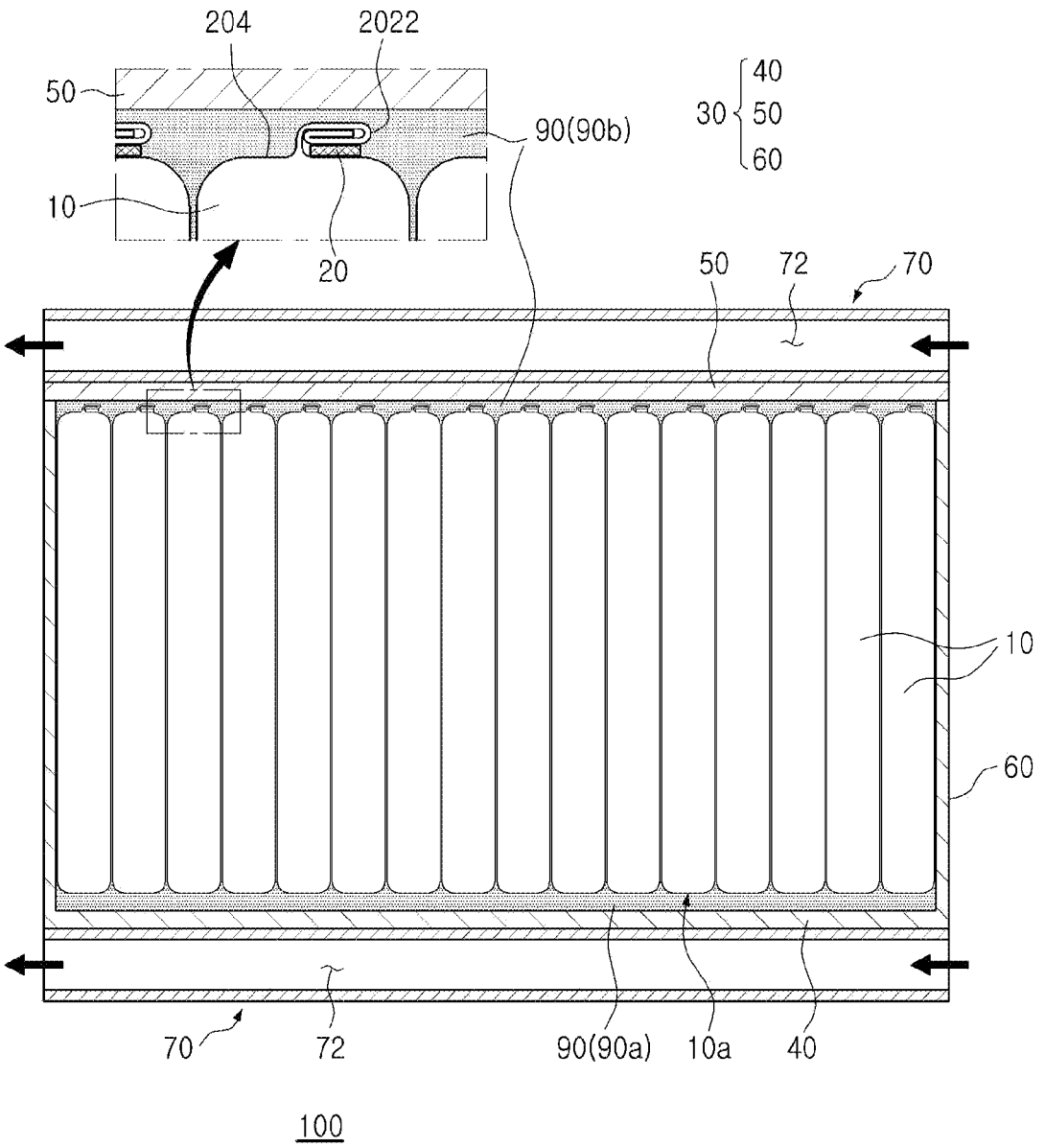
FIG. 4 is a cross-sectional view of a battery module including the battery cell illustrated in FIG. 1.

FIG. 4 is a cross-sectional view of a battery module including the battery cell illustrated in FIG. 1.

Referring to FIG. 4 together, a battery module 100 of the present embodiment may include a cell stack 10a and a module housing 30.

The cell stack 10a may be formed by stacking a plurality of the battery cell 10 described above.

The battery cells 10 may be erected in the module housing 30 to be perpendicular to a bottom surface of the module housing 30, and may be stacked in left and right directions.

Although not illustrated, a buffer pad or a cooling plate may be disposed between the stacked battery cells 10.

The buffer pad may be provided to suppress expansion of an entire volume of the battery cells 10, when a specific battery cell 10 expands. Therefore, the buffer pad may be formed as a foam having a polyurethane material of which volume is reduced according to an external force, but the present disclosure is not limited thereto.

The cooling plate may be provided to quickly transfer heat generated by the battery cells 10 to the module housing 30. Therefore, the cooling plate may be disposed to contact a heat transfer member 90 or the module housing 30.

The cooling plate may be formed of a metal material having high thermal conductivity, but the present disclosure is not limited thereto.

The module housing 30 may define an exterior of the battery module 100, and may be disposed outside the battery cells 10 to protect the battery cells 10 from an external environment. Therefore, the module housing 30 may be configured to entirely surround the cell stack 10*a*, to provide an internal space for accommodating the cell stack 10*a*.

The module housing 30 may include a first plate 40 disposed below the cell stack 10*a*, a second plate 50 disposed on the cell stack 10*a*, and a third plate 60 disposed on a side surface of the cell stack 10*a*. Each of the first to third plates 40, 50, and 60 may function as a heat dissipation member dissipating heat generated in the battery cells 10 externally.

The first plate 40 may be formed of a material having a high thermal conductivity, such as metal. For example, the first plate 40 may be formed of an aluminum material. However, the present disclosure is not limited thereto, and various materials may be used as long as a material has similar strength and similar thermal conductivity, even though the material is not a metal.

The third plate 60 may be formed to extend upwardly from the first plate 40, and may support the side surface of the cell stack 10*a*. Therefore, the third plate 60 may be formed of the same material as the first plate 40.

Although not illustrated, a heat dissipation pad may be interposed between the accommodation portion 204, disposed on an outermost side of the cell stack 10*a*, and the third plate 60. The heat dissipation pad may perform a function of transferring heat from the cell stack 10*a* to the third plate 60. The heat dissipation pad of the present embodiment may be formed of the same material as the cooling member 20 described above. However, the present disclosure is not limited thereto.

The second plate 50 may be disposed on the cell stack 10*a*, and may be fastened to an upper end of the third plate 60. Like the first plate 40, the second plate 50 may be formed of a material having a high thermal conductivity, such as metal. For example, the second plate 50 may be formed of an aluminum material. However, the present disclosure is not limited thereto, and various materials may be used as long as a material has similar strength and similar thermal conductivity, even though the material is not a metal.

A heat transfer member 90 may be disposed between the cell stack 10*a* and the module housing 30.

The heat transfer member 90 may transfer heat generated by the battery cells 10 to the module housing 30. To this end, the heat transfer member 90 may be formed of a material having a high thermal conductivity.

The heat transfer member 90 may be disposed on an inner surface of the module housing 30 as a pad form, or may be filled in the module housing 30 as a liquid state or a gel state. For example, the heat transfer member 90 may be formed as a thermal grease, a thermal adhesive, or a heat dissipation pad, but the present disclosure is not limited thereto.

In addition, the heat transfer member 90 may have high insulation. For example, a material having a dielectric strength of 10 to 30 KV/mm may be used as the heat transfer member 90. Therefore, in the battery module 100 according to the present embodiment, even though insulation is partially broken in the battery cell 10, insulation between the battery cell 10 and the module housing 30 may be maintained by the heat transfer member 90 disposed around the battery cells 10.

The heat transfer member 90 of the present embodiment may include a first heat transfer member 90*a* disposed between the cell stack 10*a* and the first plate 40, and a second heat transfer member 90*b* disposed between the cell stack 10*a* and the second plate 50.

Therefore, the second sealed portion 2022 may be disposed such that one surface thereof is in contact with the cooling member 20 and the other surface thereof is in contact with the second heat transfer member 90*b*, and heat generated in the accommodation portion 204 may be transferred to the second sealed portion 2022 through the cooling member 20, and may then be rapidly transferred to the second plate 50 through the second heat transfer member 90*b*.

In the present embodiment, a case in which the heat transfer member 90 is respectively disposed on both upper and lower portions of the battery cell 10 is illustrated, but the present disclosure is not limited thereto, and the heat transfer member 90 may be also disposed in only one of the upper and lower portions of the battery cell 10 may be used.

Also, the battery module 100 of the present embodiment may include a cooling device 70 to efficiently dissipate heat transferred to the module housing 30. In the present embodiment, the cooling device 70 may be respectively disposed on both a lower surface of the first plate 40 and an upper surface of the second plate 50. However, the configuration of the present disclosure is not limited thereto, and various modifications such as locating the cooling device 70 on only one of the first plate 40 and the second plate 50, locating the cooling device 70 on the third plate 60, or the like may be performed as needed.

The cooling device 70 may be configured as a water cooling type cooling device having a cooling passage 72 therein. However, the configuration of the present disclosure is not limited thereto, and an air cooling type cooling device may be also applied thereto.

The cooling device 70 may be integrally coupled to the module housing 30, to be included in the battery module 100. However, the present disclosure is not limited thereto, and the cooling device 70 may be provided in a device in which a battery module is mounted, separately from the battery module 100.

In the battery module 100 according to the present embodiment configured as described above, the heat transfer member 90 may be filled between the cell stack 10*a* and the module housing 30, to quickly dissipate heat from the battery cell through the cooling member 20 and the heat transfer member 90 externally.

The present disclosure is not limited to the above-described embodiment, and various modifications are possible.

Figure 5:
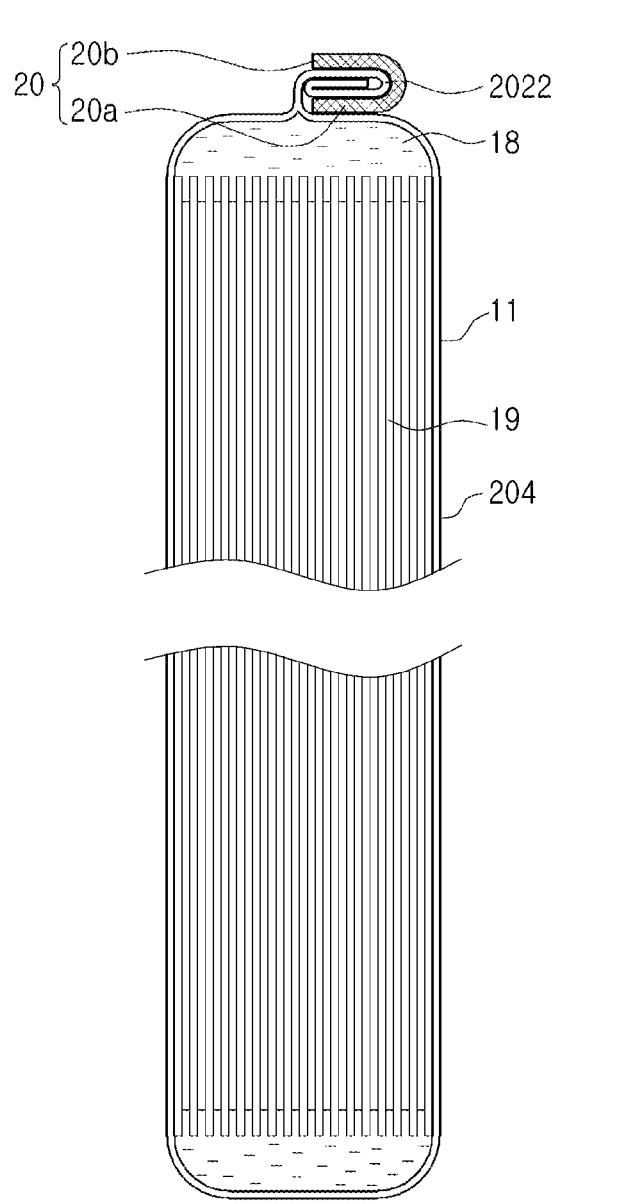
FIG. 5 is a cross-sectional view of a battery cell according to another embodiment of the present disclosure.
Figure 6:
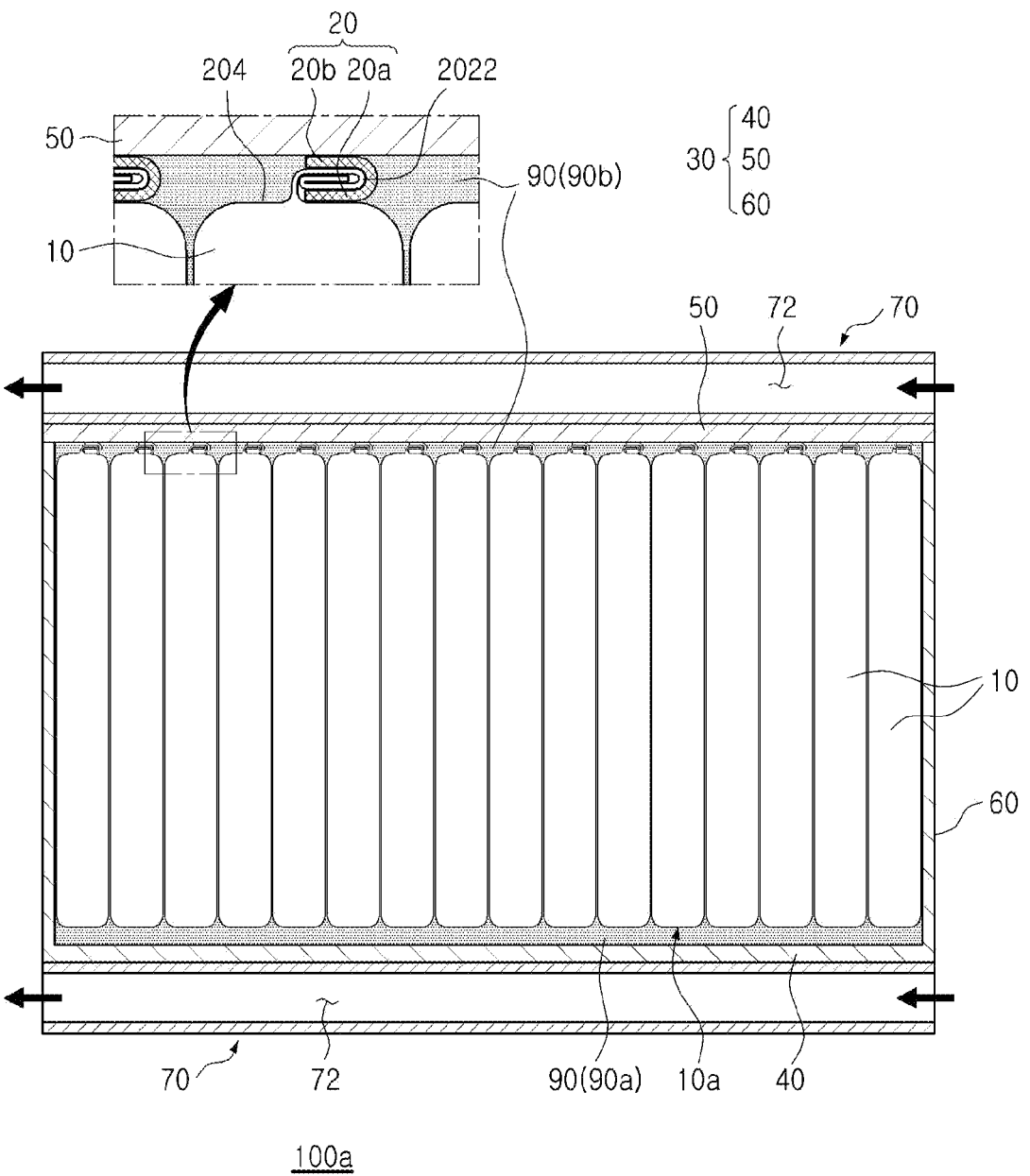
FIG. 6 is a cross-sectional view of a battery module including the battery cell illustrated in FIG. 5.

FIG. 5 is a cross-sectional view of a battery cell according to another embodiment of the present disclosure, and FIG. 6 is a cross-sectional view of a battery module including the battery cell illustrated in FIG. 5.

Referring to FIGS. 5 and 6, a battery cell 10 of the present embodiment may be coupled to a second sealed portion 2022 while covering a second sealed portion 2022 by a cooling member 20.

Specifically, the cooling member 20 of the present embodiment may include a heat transfer portion 20*a* disposed between one surface of the second sealed portion 2022 and an accommodation portion 204, and a heat dissipation portion 20*b* disposed on the other surface of the second sealed portion 2022.

The heat transfer portion 20*a* may join the second sealing unit 2022 and the accommodation portion 204 to each other, and may have the same function as the cooling member (20 in FIG. 2) of the above-described embodiment.

The heat dissipating portion 20b may extend from the heat transfer portion 20a to cover an outer surface of the second sealed portion 2022. Therefore, as illustrated in FIG. 6, since the heat dissipating portion 20b may be disposed such that one surface thereof is joined to the second sealed portion 2022 and the other surface thereof is in contact with a second plate 50 of the module housing 30, no heat transfer member 90 may be disposed between the heat dissipating portion 20b and the second plate 50. However, the present disclosure is not limited thereto, and a heat transfer member 90 may be disposed between the heat dissipating portion 20b and the second plate 50, as necessary.

The heat transfer portion 20a and the heat dissipating portion 20b may be formed as a single member. For example, the cooling member of the present embodiment may be formed as a folded shape to surround the second sealed portion 2022 as a single member. Therefore, since heat flowing into the heat transfer portion 20a may be rapidly transferred to the second plate 50 through the heat dissipation portion 20b, heat from the accommodation portion may be rapidly discharged externally. However, the configuration of the present disclosure is not limited thereto, and the heat transfer portion 20a and the heat dissipation portion 20b may be also configured as two mutually independent members, as necessary.

Figure 7:
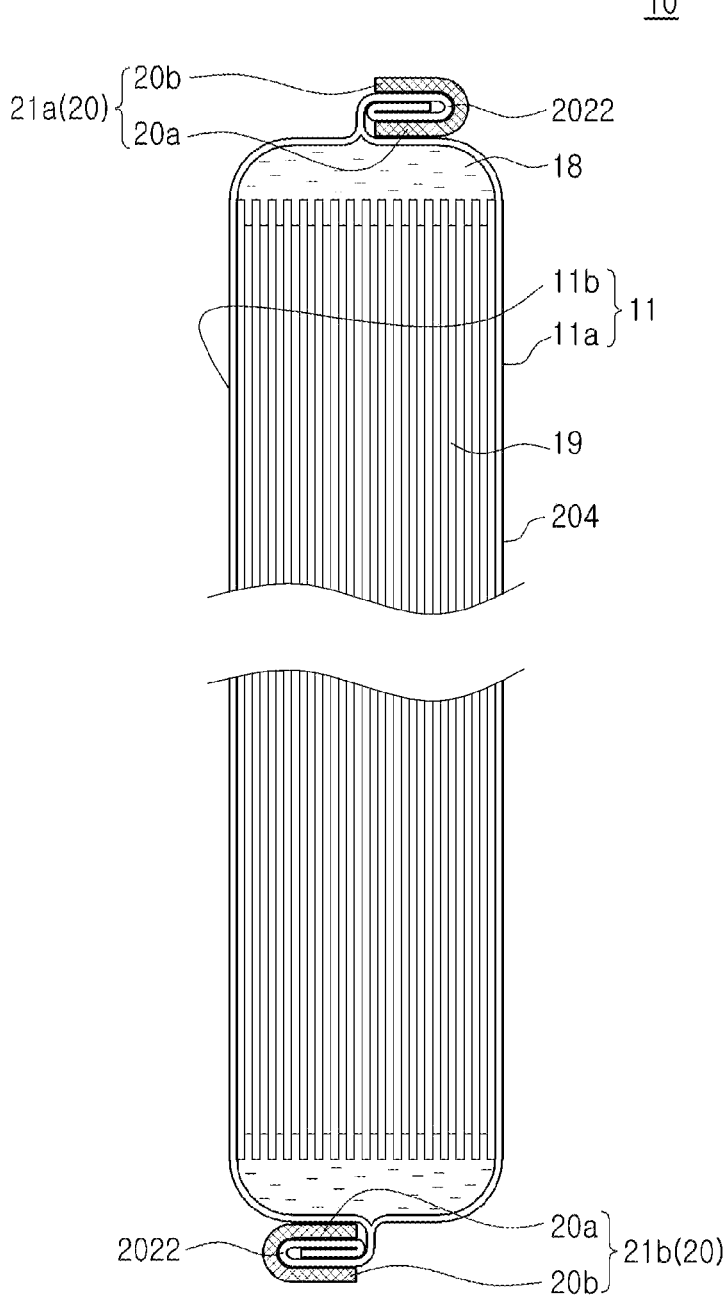
FIG. 7 is a cross-sectional view of a battery cell according to another embodiment of the present disclosure.
Figure 8:
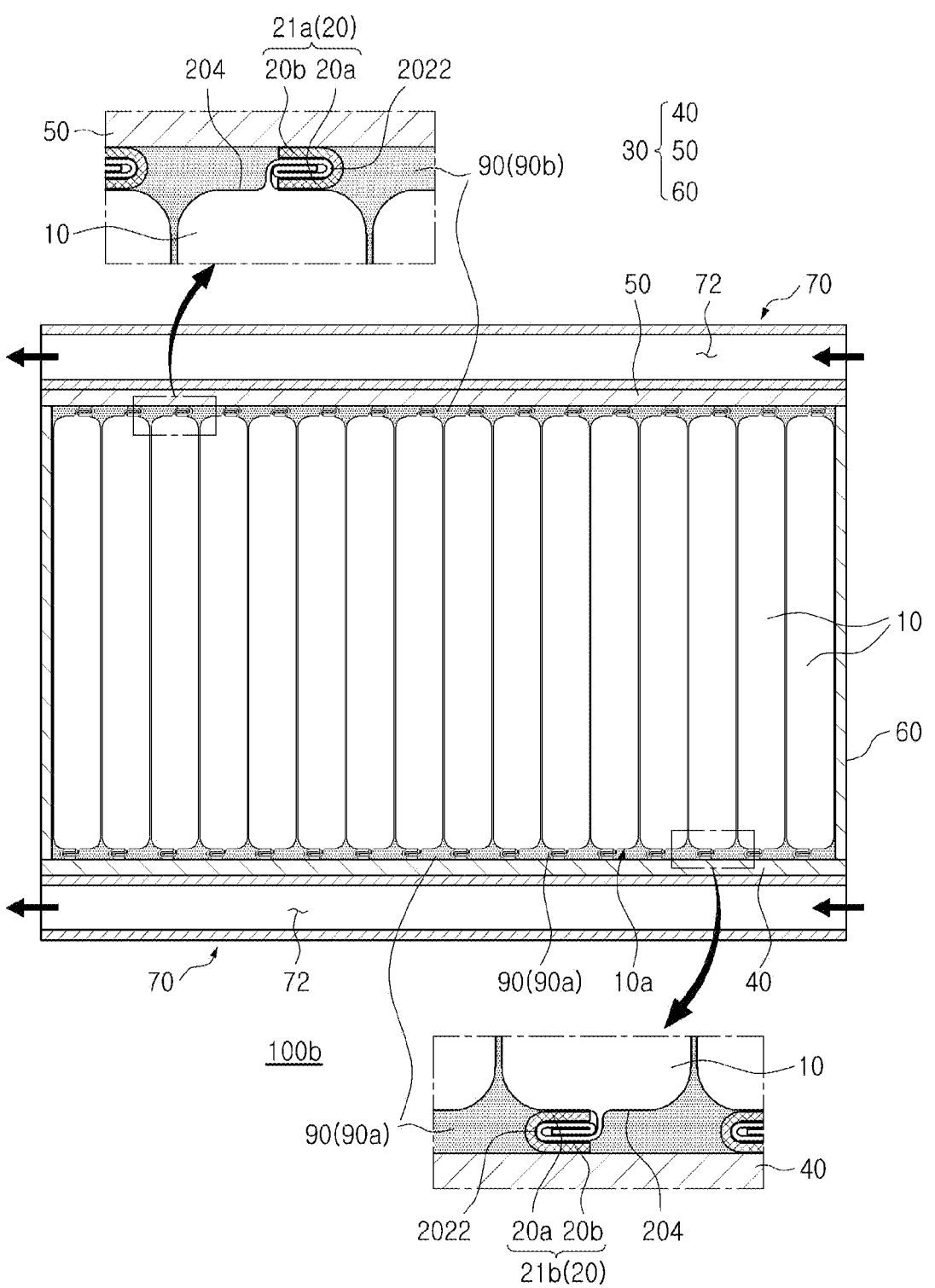
FIG. 8 is a cross-sectional view of a battery module including the battery cell illustrated in FIG. 7.

FIG. 7 is a cross-sectional view of a battery cell according to another embodiment of the present disclosure, and FIG. 8 is a cross-sectional view of a battery module including the battery cell illustrated in FIG. 7.

Referring to FIGS. 7 and 8, a battery cell 10 of the present embodiment may be configured to form sealed portions 202 on four surfaces thereof.

In the battery cell 10 of the present embodiment, a case 11 may be formed by joining two sheets of exterior materials 11a and 11b. To this end, the battery cell 10 of the present embodiment may be completed by forming at least one of the two sheets of exterior materials 11a and 11b to prepare an accommodating space, arranging an electrode assembly 19 and an electrolyte 18 in the accommodating space, and joining edge portions in which the two sheets of exterior materials 11a and 11b are adjacent to each other to seal the accommodating space.

When the battery cell 10 configured in this manner is accommodated in a module housing 30, a second sealed portion 2022 may be also provided on a surface of an accommodation portion 204 of the battery cell 10 facing the first plate 40. Therefore, a cooling member 20 of the present embodiment may include a first cooling member 21a disposed on a surface of the second sealed portion 2022 facing a second plate 50, and a second cooling member 21b disposed on a surface of the second sealed portion 2022 facing the first plate 40.

In the present embodiment, a case in which each of the cooling members 21a and 21b includes a heat transfer portion 20a and a heat dissipating portion 20b is illustrated. However, the present disclosure is not limited thereto, and may be also configured to include the cooling member 20 of FIG. 2 described above.

For example, although a case in which the cooling device is disposed outside the first plate and the second plate is illustrated in the above embodiment, various modifications such as locating the cooling device inside the first plate and the second plate, configuring the first plate and the second plate to include a cooling passage, or the like may be performed. Also, each of the embodiments may be implemented in combination with each other.

In a battery cell according to an embodiment of the present disclosure, a sealed portion may be in close contact with and may be fixedly joined to an accommodation portion by a cooling member. Therefore, an energy density of the battery cell may be increased.

In addition, since a cooling member has thermal conductivity of 2 W/mK or higher, heat generated in an accommodation portion may be rapidly transferred to a sealed portion through the cooling member. Therefore, a high heat dissipation effect may be provided.

While example embodiments have been illustrated and described above, it will be apparent to those skilled in the art that modifications and variations could be made without departing from the scope of the present disclosure as defined by the appended claims.

What is claimed is:

1. A battery cell comprising:
an electrode assembly;
a case including an accommodation portion in which the electrode assembly is accommodated, and a sealed portion formed along at least a portion of a circumference of the accommodation portion; and
a cooling member interposed between the accommodation portion and the sealed portion to transfer heat of the accommodation portion to the sealed portion,
wherein the cooling member is formed of a band-shaped material having thermal conductivity of 2 W/mK or higher,
wherein the sealed portion is in close contact with and is fixed to the accommodation portion by the cooling member,
wherein the cooling member comprises:
a heat transfer portion disposed between one surface of the sealed portion and the accommodation portion; and
a heat dissipating portion disposed on the other surface of the sealed portion,
wherein the heat transfer portion and the heat dissipating portion are integrally formed as a single body to surround the sealed portion, and are coupled to the sealed portion.

2. The battery cell of claim 1, wherein the cooling member comprises:
a core layer having a band shape; and
an adhesive layer respectively stacked on both surfaces of the core layer.

3. The battery cell of claim 2, wherein the core layer is formed of a material having thermal conductivity higher than thermal conductivity of the adhesive layer.

4. The battery cell of claim 2, wherein the core layer is formed of any one of an acrylic resin, a urethane-based resin, a silicone-based resin, an epoxy-based resin, or an olefin-based resin.

5. The battery cell of claim 2, wherein the adhesive layer is formed of any one of an acrylic adhesive, a silicone-based adhesive, or a rubber-based adhesive.

6. The battery cell of claim 2, wherein the core layer is formed to be thicker than the adhesive layer.

7. The battery cell of claim 2, wherein a thickness of the cooling member is 0.1 mm to 1 mm.

8. The battery cell of claim 7, wherein a thickness of the adhesive layer is 0.01 mm to 0.2 mm.

9. The battery cell of claim 2, wherein the cooling member comprises a filler, wherein the filler is formed of a material having thermal conductivity higher than the thermal conductivity of the core layer.

* * * * *